United States Patent Office 3,751,521
Patented Aug. 7, 1973

3,751,521
HIGH IMPACT POLYOLEFIN COMPOSITIONS COMPRISING E/P BLOCK COPOLYMER AND HIGH DENSITY POLYETHYLENE
Iamurri Roger, Le Meyran, Martigues, France
No Drawing. Continuation of abandoned application Ser. No. 811,595, Mar. 28, 1969. This application June 18, 1971, Ser. No. 154,675
Claims priority, application France, Apr. 17, 1968, 148,370
Int. Cl. C08f 37/18
U.S. Cl. 260—876 B            10 Claims

ABSTRACT OF THE DISCLOSURE

High impact strength polyolefin compositions formulated of 50% to 98% by weight polyethylene having a specific gravity greater than 0.96 and 50% to 2% by weight of a sequenced copolymer formed of 5% to 50% by weight of a sequence obtained by statistic copolymerization of ethylene and propylene with the remainder formed of a previous or subsequent sequence of polymerized propylene.

---

This is a continuation of copending application Ser. No. 811,595, filed Mar. 28, 1969, now abandoned.

This invention relates to high impact strength polyolefin compositions having high rupture strength and high fluidity for easy processing by conventional injection molding.

Polyethylene polymerization, with Ziegler type catalysts, is known to produce polyethylene polymers of relatively low molecular weight and having a high degree of crystallinity, suitable for use in injection molding. Such polymers are, however, unsuitable for use in a number of applications by reason of their relatively low impact strength.

It is known that polyethylene polymers of higher molecular weight give higher impact strength but that such increase in impact strength is usually accompanied by a decrease in fluidity, while in the molten state, such that the compositions are more difficult to injection mold.

It is also possible to mix poor impact strength polymers with homopolymers or copolymers of olefins which are substantially amorphous and which are characterized by good elastic properties. Such mixtures have improved impact strength and improved fluidity but yield products which are fragile by reason of their poor elongation to rupture, especially at low temperatures.

It is also known to incorporate, with the polyethylene, a certain amount of sequenced copolymer of ethylene and propylene in which the sequences are produced alternately by homopolymerization of ethylene or propylene. The resulting compositions have a high degree of fluidity in their molten state, but their impact strength is no better than the polyethylene included within the mixture.

Attempts have been made to incorporate an amount of propylene into the polyethylene, but the polymers are not completely compatible such that the mixtures have different mechanical properties, especially poor elongation to rupture and low impact strength.

It is an object of this invention to produce and to provide a method for producing polyolefin compositions characterized by high impact strength, good elongation to rupture and high fluidity in the molten state.

It has been found that it is possible to incorporate into polyethylene certain sequenced copolymers, including one or two sequences obtained by polymerization of propylene and a sequence obtained by statistic copolymerization of a mixture of ethylene and propylene, with the resulting mixture being characterized by unexpectedly high mechanical properties such as rigidity, impact strength, elongation to rupture, and fluidity in the molten state.

The invention comprises a composition formed of thermoplastic materials containing 50% to 98% by weight of polyethylene, obtained in accordance with the well known Ziegler-Natta process, using a Ziegler type catalyst, said polyethylene being characterized by a high specific gravity of more than 0.960 and 50% to 2% by weight of a sequenced copolymer of ethylene and propylene containing 5% to 50% by weight of a sequence obtained by statistic copolymerization of a mixture of ethylene and propylene containing approximately 60% to 85% by weight ethylene, said sequence being preceded and/or followed by a sequence obtained by the polymerization of polypropylene, and in which the sequence of statistic copolymerization of the mixture of ethylene and propylene preferably represents 10% to 20% by weight of the copolymer. The sequenced copolymer may also be produced by the now well known conventional Ziegler-Natta process, using a Ziegler type catalyst, as represented by U.S. Pats. No. 3,070,549, No. 3,113,115, No. 3,037,972 and No. 3,073,811.

The amount of statistic copolymer incorporated in the polypropylene depends somewhat upon the properties desired in the final composition. Increased amounts of statistical copolymer give increased impact strength but slightly lower rigidity.

In accordance with the practice of this invention, the mixture of polyethylene and sequenced copolymer can be easily effected by conventional means, using conventional equipment for mixing plastic materials. For example, the materials can be mixed together while in the form of a powder and then combined by a kneading operation while heating to elevated temperature for reduction of the materials to a plastic or molten state, as by conventional mixing rolls, kneaders, Banbury or the like.

By reason of their high degree of fluidity, rigidity and impact strengths, the compositions of this invention find excellent use in the injection molding of large articles which require good rigidity and impact strength and which can be subjected to widely varying temperatures, as represented by dust bins, cartons, crates for the shipment of fruits and vegetables, bottle racks, etc.

In the following examples, the properties measured were determined by the following methods:

Fusion index was measured in accordance with ASTM 1238–52 T norm, in grams of material per 10 minutes, using a load of 2.160 kg. at a temperature of 190° C. with polyethylene and 230° C. with the copolymer and the various compositions under study.

Impact strength was measured in kg.cm./sq.cm. by means of the Charpy notched impact test using a pendulum on a specimen in the form of a parallelepiped having a length of 120 mm., a width of 10 mm. and thickness of 4 mm. Use was made of a notch 4 mm. long and 2 mm. deep, set at an angle of 45° parallel to the thickness of the specimen in the axis of one of the faces measuring 120 mm. by 4 mm., with the pendulum striking the specimen on the face opposite the notched face.

Bending strength was measured in kg./sq.cm. by means of the Dynstat apparatus of the Centre d'Etude des Matieres Plastiques (Center for the Study of Plastics Materials).

The percentage of elongation to rupture was measured in accordance with ISO R 527 norm.

Fluidity was measured by means of a Netstal injection press in which the composition being tested was heated to a temperature of 225° C. and injected under a pressure of 865 bars into a mold in the form of a spiral maintained at a temperature of 25° C. The polymer enters the mold until it hardens and the spiral fluidity is the length in mm. of the resulting spiral of plastic material that is formed.

The following examples are given by way of illustration, but not by way of limitation:

EXAMPLE 1

Mixing is effected, initially with materials in the powder state and then in the molten state by means of a slubbing machine provided with a double screw, of 80 parts by weight of polyethylene having a specific gravity of 0.963, prepared by the Ziegler process, and 20 parts by weight of a sequenced copolymer which is obtained by a reaction carried out in the following manner:

In a first phase, a mixture of ethylene and propylene is polymerized to produce a sequence of statistic copolymerization of ethylene and propylene representing 15% by weight of the total sequence copolymer to be produced and in which the percentage of ethylene units in the sequence was approximately 70% by weight.

In a second phase, polymerization was continued with propylene until a copolymer is obtained which includes a sequence of homopolymerization of propylene representing the remainder of 85% by weight of the sequenced copolymer.

The constituents of the mixture and the resulting composition have the properties given in the following Table I:

TABLE I

| Composition | Fusion index | Impact strength (cm. kg./sq. cm.) at— | | Bending strength (kg./sq. cm.) | Elongation to rupture (percent) at— | | Spiral fluidity (mm.) |
|---|---|---|---|---|---|---|---|
| | | 23° C. | 0° C. | | 23° C. | 0° C. | |
| Polyethylene having a specific gravity of 0.963 | 6 (at 190° C.) | 3.5 | 2 | 680 | 1,200 | 300 | 360 |
| Sequenced copolymer | 2 (at 230° C.) | 40 | 15 | 425 | 900 | 600 | 480 |
| Composition (polyethylene 80%, copolymer 20%) | 3 (at 230° C.) | 10 | 6 | 630 | 700 | 600 | 370 |

EXAMPLE 2

A mixture is made in the same manner as in Example 1 of 90 parts by weight of the same polyethylene and 10 parts by weight of the sequenced copolymer resulting from a reaction comprising the following three phases:

First phase: Polymerization of propylene producing a sequence representing 60% by weight of the total copolymer to be used.

Second phase: Statistic copolymerization of a mixture of ethylene and propylene producing a sequence representing 10% by weight of the total copolymer with the percent of ethylene units in this sequence being 67% by weight.

Third phase: Polymerization of propylene producing a sequence representing the remaining 30% by weight of the copolymer.

The properties of the sequenced copolymer and the composition containing 90% of polyethylene are given in the following Table II:

TABLE II

| Composition | Fusion index (at 230° C.) | Impact strength (cm. kg./sq. cm.) at— | | Bending strength (kg./sq. cm.) | Elongation to rupture (percent) | | Spiral fluidity (mm.) |
|---|---|---|---|---|---|---|---|
| | | 23° C. | 0° C. | | 23° C. | 0° C. | |
| Sequenced copolymer | 1.3 | 35 | 15 | 450 | 600 | 300 | 460 |
| Composition (polyethylene 90% copolymer 10%) | 4.8 | 12 | 6 | 550 | 1,100 | 400 | 390 |

EXAMPLE 3

A sequenced copolymer is prepared in accordance with a reaction comprising the following three phases:

First phase: Polymerization of propylene producing a sequence representing 10% by weight of the total copolymer.

Second phase: Statistical polymerization of a mixture of ethylene and propylene producing a sequence representing 20% of the total weight of the copolymer, with the percentage of ethylene units in this sequence being 75% by weight.

Third phase: Polymerization of propylene producing a sequence representing 70% by weight of the total weight of the copolymer.

Two mixtures are prepared from the sequenced copolymer prepared as above and the polyethylene as in Example 1, the two mixtures representing approximately 35% and 50% by weight of the sequenced copolymer and 65% and 50% by weight respectively of the polyethylene.

The properties of the resulting compositions are given in the following Table III:

TABLE III

| Composition | Fusion index (at 230° C.) | Impact strength (cm. kg./sq. cm.) at— | | Bending strength (kg./sq. cm.) | Elongation to rupture (percent) | | Spiral fluidity (mm.) |
|---|---|---|---|---|---|---|---|
| | | 23° C. | 0° C. | | 23° C. | 0° C. | |
| Sequenced copolymer | 1.2 | 60 | 22 | 415 | 700 | 300 | 450 |
| Mixture (polyethylene 50% copolymer 50%) | 1.6 | 40 | 18 | 470 | 1,000 | 800 | 360 |
| Mixture (polyethylene 65% copolymer 35%) | 2 | 21 | 12 | 500 | 700 | 700 | 360 |

EXAMPLE 4

A mixture is made in the same manner as Example 1, of 70 parts by weight of the same polyethylene and 30% by weight of the sequenced copolymer obtained by the reaction comprising the following three phases:

First phase: Polymerization of propylene producing a sequence representing 20% by weight of the total weight of the copolymer.

Second phase: Statistic copolymerization of a mixture of ethylene and propylene producing a sequence representing 15% by weight of the total weight of the copolymer, the percentage of ethylene units in this sequence being 82% by weight.

Third phase: Polymerization of propylene producing a sequence representing 65% by weight of the total weight of the copolymer, The properties of the sequenced copolymer and the compositions containing 70% by weight of polyethylene are given in the following Table IV:

TABLE IV

| Composition | Fusion index (at 230° C.) | Impact strength (cm. kg./sq. cm.) at— | | Bending strength (kg./sq. cm.) | Elongation to rupture (percent) | | Sprial fluidity (mm.) |
|---|---|---|---|---|---|---|---|
| | | 23° C. | 0° C. | | 23° C. | 0° C. | |
| Sequenced copolymer | 0.5 | 50 | 23 | 530 | 500 | 400 | 427 |
| Mixture (polyethylene 70%, copolymer 30%) | 1.2 | 25 | 10 | 550 | 900 | 700 | 370 |

I claim:

1. A composition of thermoplastic material consisting essentially of 50% to 98% by weight of polyethylene having a specific gravity of more than 0.960 and prepared by polymerization of ethylene in the presence of a Ziegler type catalyst, and 2% to 50% by weight of a sequenced copolymer of ethylene and propylene comprising 5% to 50% by weight of a sequence obtained by statistic copolymerization of a mixture of ethylene and propylene containing ethylene units in an amount within the range of 60% to 85% by weight, said sequence being combined with a sequence obtained by the polymerization of propylene.

2. A composition as claimed in claim 1 in which the polymerizations are carried out in accordance with the Ziegler-Natta process, using a Ziegler type catalyst.

3. A composition as claimed in claim 1 in which the sequence of polymerization of propylene precedes the sequence obtained by statistic copolymerization.

4. A composition as claimed in claim 1 in which the sequence obtained by the polymerization of propylene follows the sequence obtained by statistic compolymerization.

5. A composition as claimed in claim 1 which the sequenced copolymer contains 10% to 20% by weight of the sequence obtained by statistic copolymerization.

6. Injection molded articles produced by the composition of claim 1.

7. In the method of producing a thermoplastic composition comprising producing a sequenced copolymer of ethylene and propylene by statistically copolymerizing a mixture of ethylene and propylene containing ethylene units in an amount within the range of 60% to 85% by weight, polymerizing propylene in sequence and combining the sequence obtained by the polymerization of propylene with the sequence obtained by statistical polymerization of propylene and ethylene in the ratio wherein the combined sequenced copolymer contains 5% to 50% by weight of the statistical copolymer and combining the sequenced copolymer with polyethylene having a specific gravity of more than 0.960 and prepared by polymerization of ethylene in the presence of a Ziegler type catalyst to provide a thermoplastic composition consisting essentially of 50% to 98% by weight of the polyethylene and 50% to 2% by weight of the sequenced copolymer.

8. The method as claimed in claim 7 in which the sequence of polymerization of propylene is carried out before the statistical copolymerization of ethylene and propylene.

9. The method as claimed in claim 7 in which the sequence of polymerization of propylene is carried out subsequent to the statistical copolymerization of ethylene and propylene.

10. The method as claimed in claim 7 in which the sequence of polymerizing propylene is carried out both before and after the statistical copolymerization of ethylene and propylene.

References Cited

UNITED STATES PATENTS

| 3,358,053 | 12/1967 | Hostetler | 260—876 |
| 3,328,486 | 6/1967 | Crawford et al. | 260—876 |
| 3,487,128 | 12/1969 | Okazaki et al. | 260—876 |
| 3,627,852 | 12/1971 | Aishima et al. | 260—876 |
| 3,632,674 | 1/1972 | Aishima et al. | 260—876 |

FOREIGN PATENTS

| 1,560,565 | 2/1969 | France | 260—876 |
| 1,208,065 | 10/1970 | Great Britain | 260—876 |

MURRAY TILLMAN, Primary Examiner

C. SECCURO, Assistant Examiner

U.S. Cl. X.R.

260—878 B

UNITED STATES PATENT OFFICE
CERTIFICATE OF CORRECTION

Patent No. 3,751,521　　　　　　　　　Dated August 7, 1973

Inventor(s) Roger IAMURRI

It is certified that error appears in the above-identified patent and that said Letters Patent are hereby corrected as shown below:

Column 4, in Table II, column "Impact strength", at 0°C, line 2, delete "6" and insert therefor -- 5 --

Signed and sealed this 23rd day of April 1974.

(SEAL)
Attest:

EDWARD M. FLETCHER, JR.　　　　　　　C. MARSHALL DANN
Attesting Officer　　　　　　　　　　　Commissioner of Patents